June 8, 1954  S. GELLER  2,680,663
CLOTHESPIN DISPENSING RACK
Filed March 8, 1950  2 Sheets-Sheet 1

INVENTOR.
SAMUEL GELLER
BY
ATTORNEY

June 8, 1954
S. GELLER
2,680,663
CLOTHESPIN DISPENSING RACK
Filed March 8, 1950
2 Sheets-Sheet 2
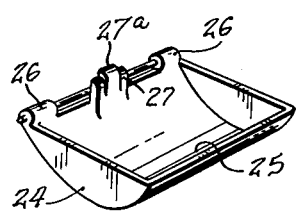
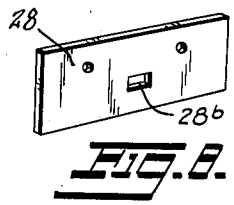
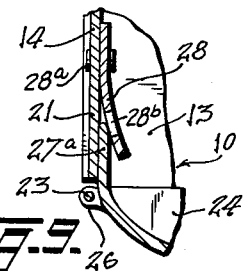
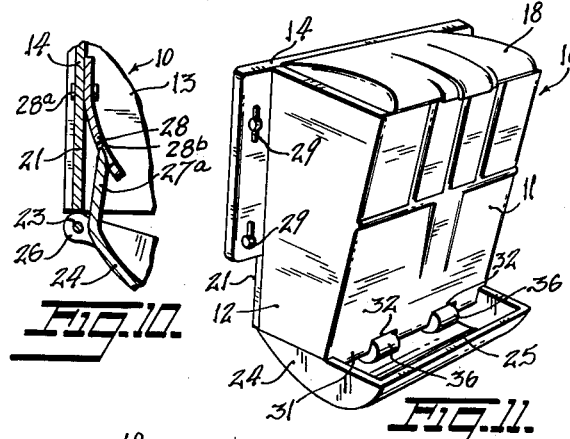
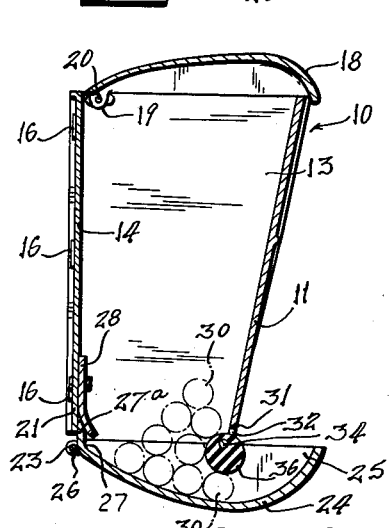
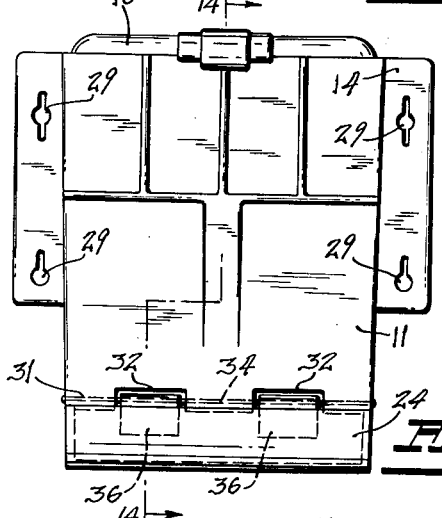
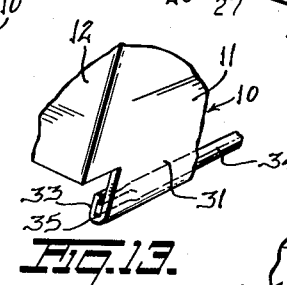
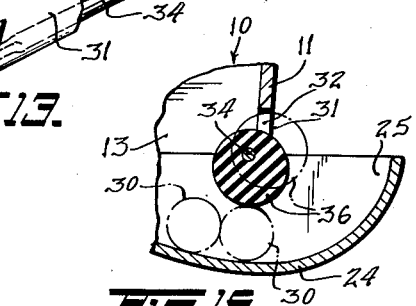
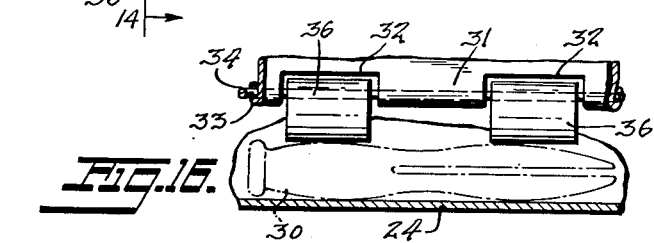
INVENTOR.
SAMUEL GELLER
BY
ATTORNEY Patented June 8, 1954

2,680,663

UNITED STATES PATENT OFFICE 2,680,663

CLOTHESPIN DISPENSING RACK

Samuel Geller, Brooklyn, N. Y.

Application March 8, 1950, Serial No. 148,350

2 Claims. (Cl. 312—83)

This invention relates to dispensers and pertains particularly to a dispenser for clothespins or like articles.

One object of the present invention is to provide a novel, simplified, and inexpensively manufactured dispenser for clothespins which is easily operable manually for dispensing the clothespins one at a time to a housewife or other person whose task it is to hang wash or other articles out to dry.

Another object of the present invention is to provide a clothespin dispenser which may be mounted on a wall or other support adjacent one terminus of a clothesline and which may receive a supply of clothespins therein to be dispensed therefrom one at a time by a simple one-hand actuation of a dispensing tray.

Still another object of the present invention is to provide a clothespin dispenser which dispenses a single clothespin in response to an actuation of a dispensing tray and includes means adjustable for accommodating the dispensation therefrom of clothespins of various cross sections throughout their lengths.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 7 is an isometric view of the dispensing tray.

Fig. 8 is an isometric view of the spring plate.

Fig. 9 is an enlarged detailed view of a portion of Fig. 5.

Fig. 10 is a view similar to Fig. 9, but showing the position of the parts when the dispensing tray is lowered or downwardly actuated.

Fig. 11 is a view similar to Fig. 1, but showing a modification of the present invention.

Fig. 12 is a front elevational view of Fig. 11.

Fig. 13 is a fragmentary isometric view illustrating the means for preventing turning of the rod upon which the adjustable eccentrics are carried.

Fig. 14 is a vertical sectional view taken substantially along the line 14—14 in Fig. 12.

Fig. 15 is an enlarged detailed view of a portion of Fig. 14.

Fig. 16 is an enlarged fragmentary and partially sectionalized view illustrating the association between the adjustable eccentrics and a particularly configured clothespin.

Figure 1:
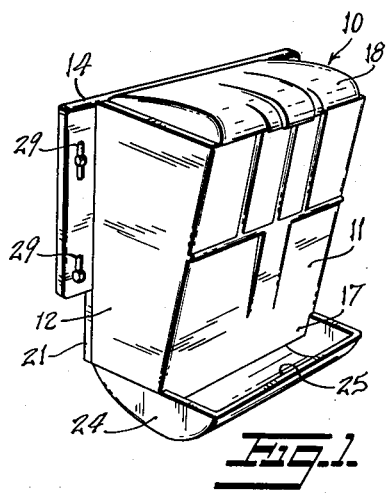
Fig. 1 is an isometric view illustrating the preferred embodiment of the present invention.

The clothespin dispenser, according to the first form of the present invention, includes a clothespin hopper 10, which hopper includes a front panel 11, a left panel 12, a right panel 13, all formed from a single sheet of material such as steel, and a back panel 14 of like material. Said back panel 14 is provided with spaced slots 15 for receiving tabs 16 formed correspondently and spaced along the rear edges of said side panels, which tabs when bent over provide the means whereby said side panels, and therefore said front panel also, are held to said back panel to form a box-like structure, which the hopper essentially is. The mentioned front panel 11 is provided with a pendent portion 17, the purpose of which will be explained hereinafter.

Figure 5:
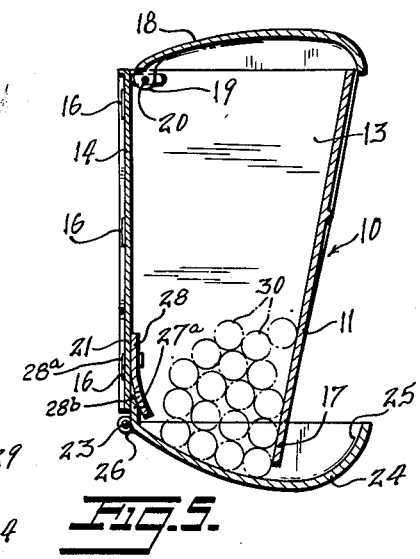
Fig. 5 is a section taken substantially along the lines 5—5 in Fig. 3 and illustrates the association of the dispensing tray with the spring plate.
Figure 6:
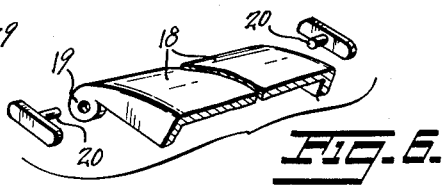
Fig. 6 is a fragmentary isometric view illustrating the side ears formed off the cover and the trunnions adapted to associate with holes in said ears for the pivotal mounting of said cover.

Provided to cover the open top end of the hopper is a cover 18 which cover is formed at the rear side portions thereof with pivot ears 19, see Figs. 5 and 6. In order to mount the cover 18 in a pivotal manner trunnions 20 are provided and are secured to the side panels 12 and 13 adjacent the top edge of the back plate 14, as by welding. Said trunnions are inserted in the pivot ears just prior to the assembling step in which the aforementioned tabs 16 are inserted in the said slots 15. Therefore, when the tabs are bent over after being inserted in said slots the cover will be securely and effectively mounted pivotally between said side panels.

Figure 4:
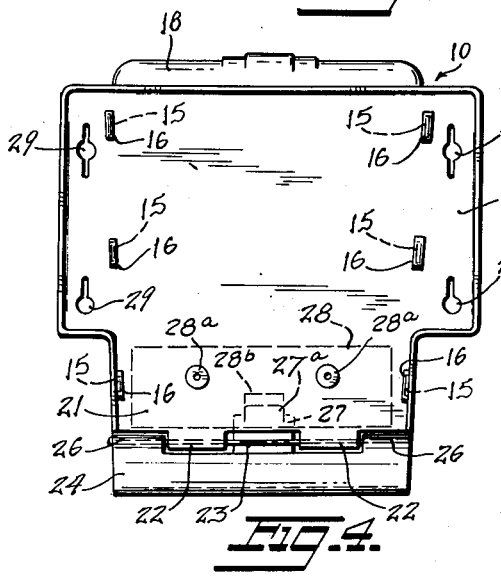
Fig. 4 is a rear elevational view of the preferred embodiment and illustrates the manner in which both the spring plate and dispensing tray are attached to the back panel.

As seen best in Fig. 4 the said back panel 14 is also provided with a pendent portion 21 having dual beaded edges 22 which beaded edges are such as to provide sleeves for receiving a pivot rod 23, the purpose of which will be seen hereinafter.

In order to close the open bottom of the hopper 10 and thus retain a supply of clothespins therein, a dispensing tray 24 is provided. The tray 24 is of a scoop-like construction, being longer in depth than the said hopper to have a forwardly projected lip 25. Formed at either side of the rear edge of said tray is a pivot sleeve 26 adapted for being fitted loosely on the ends of the pivot rod 23, in order that the tray may be secured pivotally to the back panel 14.

Formed centrally on the rear edge of said dispensing tray is an upwardly extending lever portion 27, which portion is positioned in back of a spring plate 28 fastened as by rivets 28ª to the above mentioned back panel 14 (Figs. 4, 5, 7 and 8). As better seen in Fig. 9, the association between said lever portion 27 and spring plate 28 is such as to maintain the dispensing tray 24 normally resiliently held in a raised position, in which position the open bottom end of the hopper is closed by said tray. However, said tray, in view of the pivotal connection between the same and the back panel 14, may be lowered against the tension of the spring plate 28 to provide an opening between the tray and the bottom end of the hopper.

Means is provided in connection with the lever portion 27 and the spring plate 28 to restrict downward movement of the tray 24 to a position in which the spacing of the bottom wall of the tray from the bottom edge of the pendant portion 17 will be such that only a single clothespin 30 can pass beneath the pendant portion 17 onto the lip 25. That movement restricting means comprises an upstanding lug 27ª formed on the lever portion and a corresponding cutout 28ᵇ formed on the spring plate 28. When the tray 24 is lowered, the lug 27ª strikes the material of the spring plate at the bottom of the cutout 28ᵇ, as shown in Fig. 10, retaining the tray against further downward movement so that the clothespins 30 can pass only one at a time beneath the lower edge of the pendant portion 17.

Figure 3:
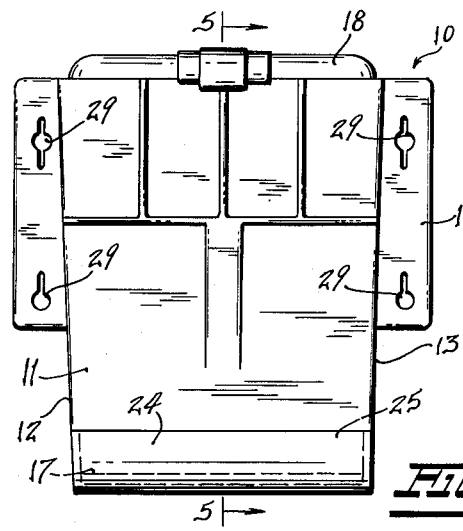
Fig. 3 is a front elevational view of Fig. 1.
Figure 2:
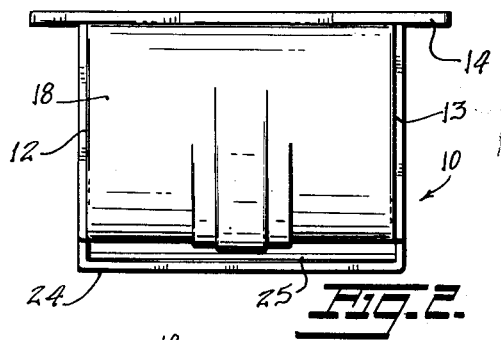
Fig. 2 is a plan view of Fig. 1.

Any suitable means may be provided for securing the clothespin dispenser to a wall or other support adjacent a terminus of a clothesline for facilitated access thereto. However, as seen in Figs. 3 and 4, the side portions of said back panel 14 are preferably provided with hole-and-slot openings 29 which are adapted to cooperate with the heads of screws embedded in the mentioned wall or support to thereby provide means whereby the arrangement is detachably securable to said wall or support.

It will be seen that the above described embodiment is adapted to receive a supply of longitudinally stacked clothespins, which clothespins are shown in dot and dash and designated 30 in Fig. 5, and normally rest on the dispensing tray 24 when the tray is in a raised position. When the tray is manually lowered or actuated against the tension of the spring plate 28 an opening is effected between the above mentioned pendent portion 17 on the front panel 11 and the tray, to permit a clothespin to roll one at a time into the lip 25. Releasing the tray permits the spring plate 28 to return it to its normal raised position.

The modification of the invention shown in Figs. 11 to 16 is substantially similar to the just described first embodiment in that it too provides a hopper 10 including a front panel 11, a left panel 12, a right panel 13, and a back panel 14, a cover 18 trunnioned between the side panels 12 and 13, and a dispensing tray 24 pivotally attached to the bottom edge of said back panel 14 and having a lip 25.

As perhaps best seen in Fig. 14, the present embodiment also includes an upwardly extending lever portion 27 formed on the rear edge of said dispensing tray and adapted for association with a spring plate 28 secured to the inner side of the back panel 14 to thereby maintain said tray normally and resiliently held raised and to restore said tray after it has been lowered or actuated downwardly together with the means to restrict dispensing of the clothespins to one at a time.

In the present arrangement a pendent portion 31 formed on the front panel 11 is provided with dual cut-outs 32 and the edge of said pendent portion is beaded to provide sleeves 33, which sleeves are adapted to hold a rod 34 (Figs. 12, 13 and 14). As best seen in Fig. 13, the ends of the rod 34 are flattened as at 35 and the sleeves 33 when pressed thereagainst are effective for preventing the turning of said rod.

Provided to be carried on the rod 34 and disposed in the dual cut-outs 32 are dual adjustable eccentrics 36 formed of rubber or like material. Said eccentrics are so carried on the fixed rod 34 as to be individually and manually turnable thereon to thereby vary along its length the opening afforded between the same and the said dispensing tray when said tray is lowered. It will be seen that since the eccentrics are of rubber the friction between the same and the rod will be sufficient to cause them to remain in any manually pre-set position on said rod.

The just described arrangement is adapted to be adjustable for dispensing clothespins of various cross sections throughout their lengths. As clearly seen in Fig. 16 one end of a clothespin is most often different circumferentially from the other end. Therefore, one of said eccentrics 36 may be pre-set to provide sufficient space to pass one end of a clothespin between the same and the lowered tray and the other of said eccentrics may be pre-set to provide sufficient space to pass the other end of said clothespin between the same and the lowered tray. In this manner it is possible to pre-set the eccentrics according to the configurations of particular clothespins to thereby afford the dispensation thereof in parallel relation.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A clothespin dispenser comprising a box-like structure including front, side and rear panels, and being open at the top and bottom ends, a cover trunnioned between said side panels for covering said open top end, a dispensing tray pivotally attached to the lower end of said rear panel and including a lip protruding forwardly and upwardly beyond said front panel, an upwardly extending lever portion formed centrally off the rear of said dispensing tray, a spring plate affixed to said rear panel and associated with said lever portion for normally and resiliently maintaining said tray raised to thereby close the bottom end of said box-like structure, means on said lever portion engaging said spring plate to restrict lowering of said tray to dispense into said lip thereof one of a plurality of clothespins longitudinally stacked in said box-like structure and normally reposing on said tray, said spring plate being effective for restoring the lowered tray to the raised position thereof when released, dual cut-outs in the lower edge of said front panel, a fixed pivot rod crossing each of said cut-outs, and rubber eccentrics frictionally engaged on said rod within said cut-outs and individually pre-settable for determining the dispensing opening afforded between the same and the lowered dispensing tray.

2. The combination of claim 1, wherein said spring plate overlaps the upwardly extending lever portion in an arcuate shape, and a slot in said spring plate, said lever portion engaging said slot to limit the dispensing to a single clothespin.

References Cited in the file of this patent

UNITED STATES PATENTS

| Number | Name | Date |
| --- | --- | --- |
| 34,245 | Duffield | Jan. 28, 1862 |
| 450,271 | White | Apr. 14, 1891 |
| 537,811 | Bowie et al. | Apr. 23, 1895 |
| 937,408 | Bechtel | Oct. 19, 1909 |
| 1,445,348 | Noble | Feb. 13, 1923 |
| 1,903,450 | Goodman | Apr. 11, 1933 |
| 1,919,535 | Siqveland | July 25, 1933 |
| 1,997,796 | Jay | Apr. 16, 1935 |
| 2,141,983 | Hawie | Dec. 27, 1938 |
| 2,282,036 | Cobbs et al. | May 5, 1942 |
| 2,435,793 | Mielke | Feb. 10, 1948 |
| 2,522,041 | Johnsson | Sept. 12, 1950 |

FOREIGN PATENTS

| Number | Country | Date |
| --- | --- | --- |
| 25,440 | Great Britain | of 1896 |
| 715,234 | France | Sept. 21, 1931 |